United States Patent
Perie

[11] Patent Number: 5,992,995
[45] Date of Patent: Nov. 30, 1999

[54] DEVICE FOR FIXING LENSES TO A SPECTACLES FRAME

[76] Inventor: Jean-Claude Perie, 31 rue Bessières B.P. 361, 82003 Montauban, France

[21] Appl. No.: 09/091,270
[22] PCT Filed: Oct. 22, 1996
[86] PCT No.: PCT/FR96/01651
§ 371 Date: Jun. 18, 1998
§ 102(e) Date: Jun. 18, 1998
[87] PCT Pub. No.: WO97/23802
PCT Pub. Date: Jul. 3, 1997

[30] Foreign Application Priority Data

Dec. 22, 1995 [FR] France .................................. 95 15386

[51] Int. Cl.$^6$ ..................................................... G02C 1/08
[52] U.S. Cl. .............................. 351/92; 351/95; 351/154
[58] Field of Search .............................. 351/90–109, 154

[56] References Cited

U.S. PATENT DOCUMENTS

| | | | |
|---|---|---|---|
| 2,516,549 | 7/1950 | Ohappell | 351/92 |
| 3,068,751 | 12/1962 | Moeller | 351/91 |
| 4,464,025 | 8/1984 | Lhospice | 351/106 |
| 4,466,713 | 8/1984 | Tanaka | 351/106 |
| 5,073,020 | 12/1991 | Lindbert et al. | 351/106 |

FOREIGN PATENT DOCUMENTS 0 093 108  11/1983  European Pat. Off. .
2 701 573  8/1994  France .

*Primary Examiner*—Huy Mai
*Attorney, Agent, or Firm*—Sixbey, Friedman, Leedom & Ferguson, PC; Stuart J. Friedman

[57] ABSTRACT

The invention relates to apparatus for fixing lenses to a spectacles frame, the apparatus comprising, for each lens, a flexible rim element passing along an associated bezel and being secured to the frame on either side of the lens. According to the invention, each flexible element (20) is organized to have two end loops (23, 24) which are secured to the frame (2) on either side of the lens (V) in question, merely by engaging over said frame.

10 Claims, 3 Drawing Sheets

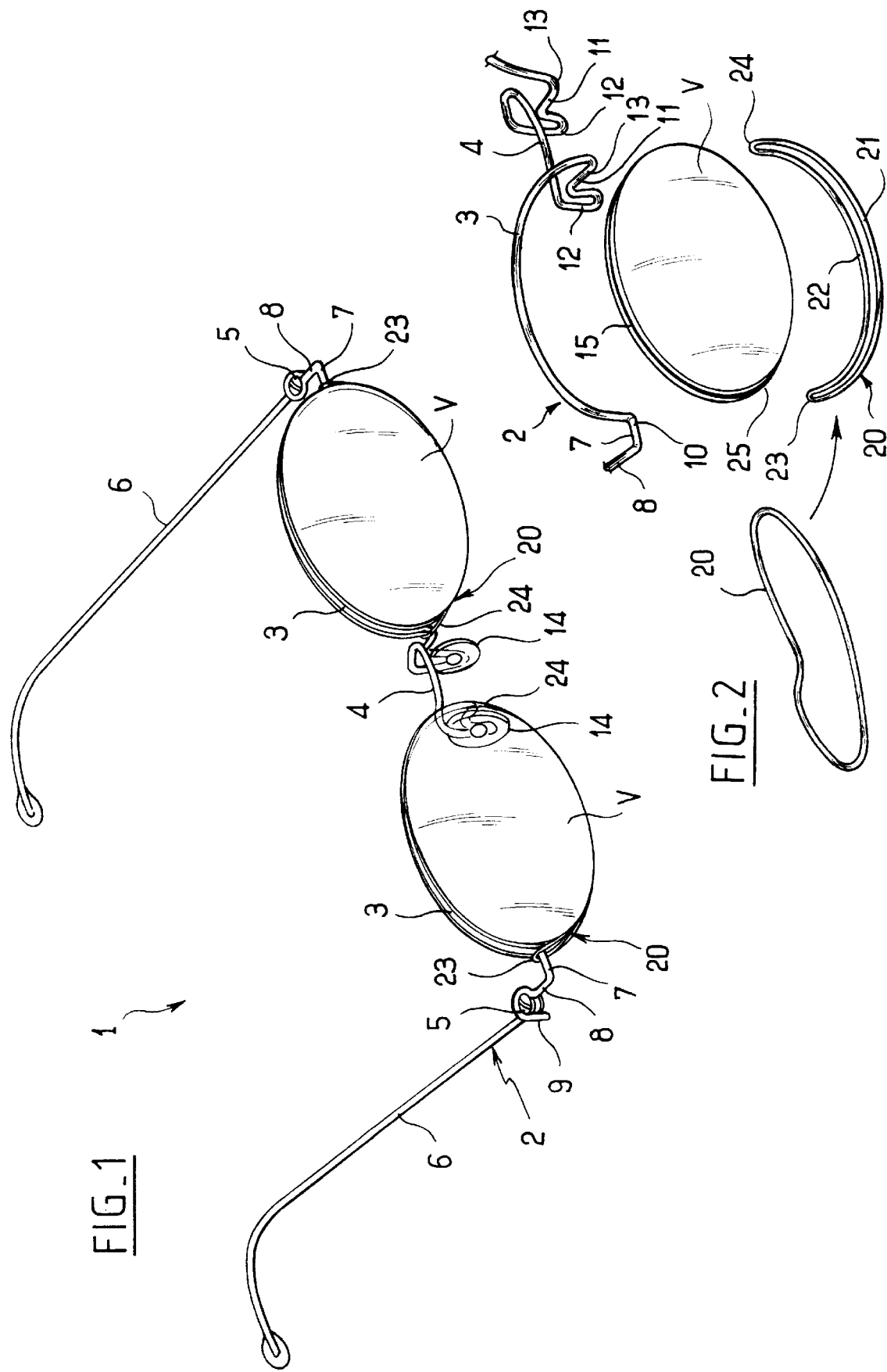

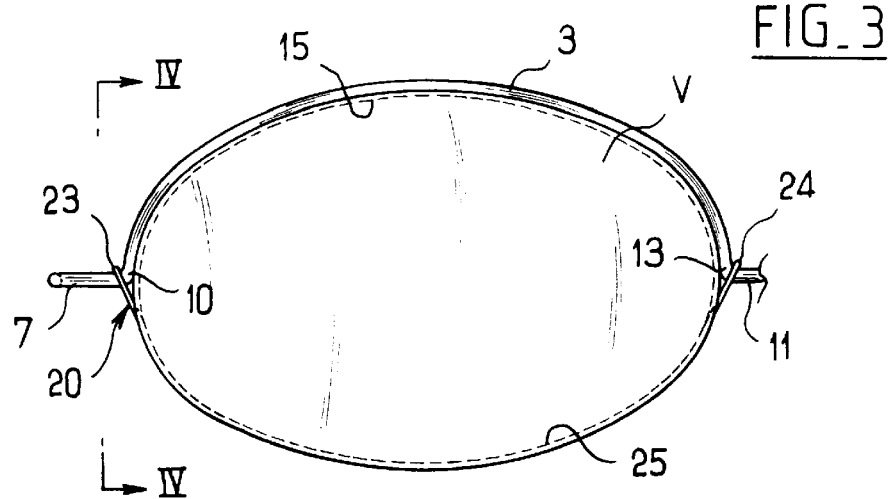
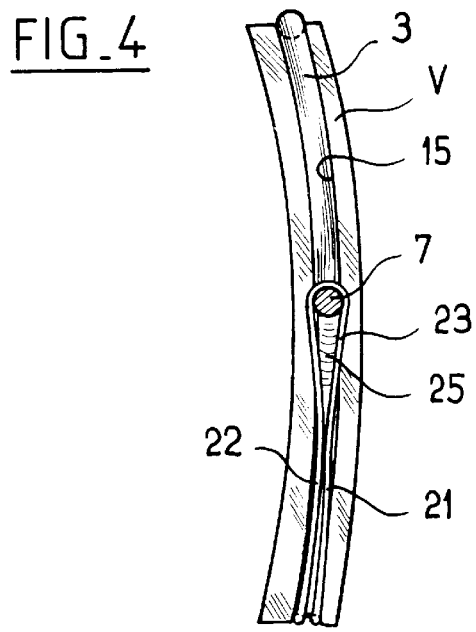
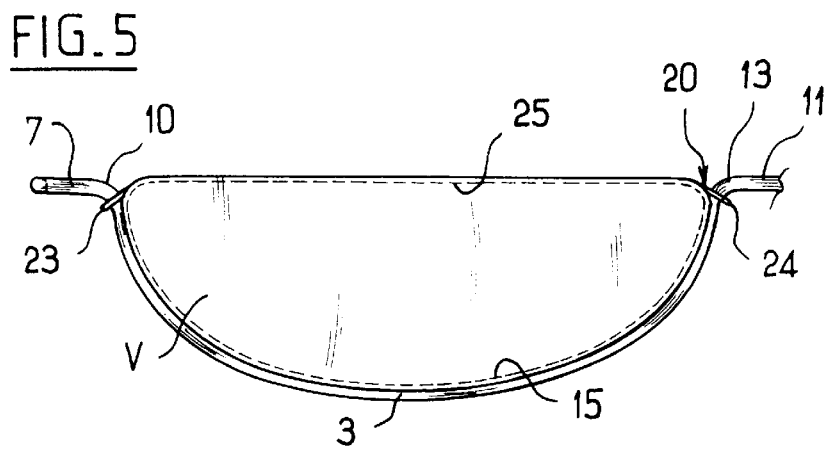

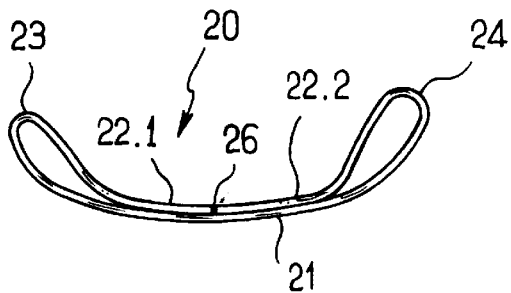
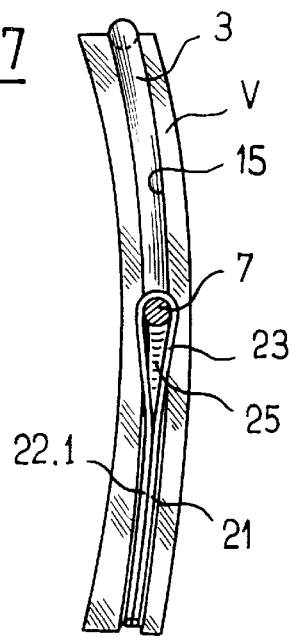
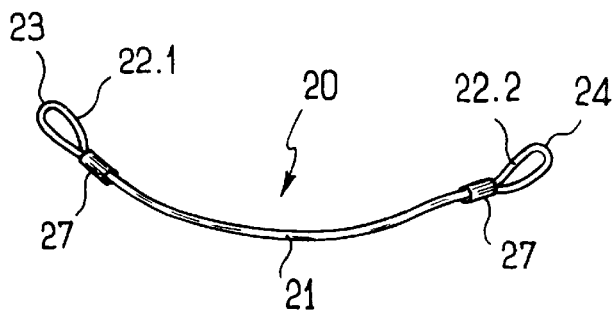
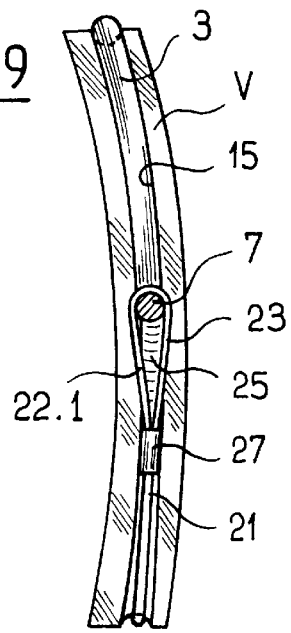

DEVICE FOR FIXING LENSES TO A SPECTACLES FRAME

The invention relates to the field of spectacles, and more particularly to fixing lenses to a spectacles frame by means of apparatus comprising, for each lens, a flexible rim element passing along an associated bezel or groove and being secured to the frame on either side of the lens.

BACKGROUND OF THE INVENTION

There exists a lens-fixing technique that has already been known for about fifty years and that consists in using flexible rim elements, in general a strand of nylon thread or of steel wire, surrounding some portion of each lens. That technique is attractive because of the effects of lightness and of inconspicuousness that it procures for a person who wears spectacles equipped in this way.

However, manufacturers have had to address the difficult problem of ensuring that such flexible elements are secured to the spectacles frame, and various solutions have been proposed.

Numerous solutions make provision to bore through the frame to enable the flexible filament (thread or wire) to pass through and to enable the end of the filament to be locked either by an extra thickness of filament (see for example Documents FR-A-2 504 694, FR-A-2 489 970, U.S. Pat. No. 2,516,549, and FR-A-1 156 468), or by knot (see for example Documents U.S. Pat. No. 2,516,549, FR-A-2 506 958, FR-A-2 701 573, EP-A-0 643 316), or else by offsetting the filament once (see Document GB-A-775 293), or twice using a two-hole technique (see for example Documents FR-A-1 094 381, FR-A-1 270 904, FR-A-2 509 058, FR-A-2 524 656, FR-A-2 530 038, EP-A-0 027 415). Document FR-E-73 293 also combines a plurality of those solutions. Document EP-A-0 093 108 proposes a variant in which each end of the filament has extra thickness force fitted into a groove in the frame, which groove is provided with an abutment at each of its ends to snap-fasten the extra thickness.

Those solutions for fixing the lenses are costly and difficult to implement because a considerable degree of accuracy is required to avoid any slack which would allow the lens to fall out. In addition, any adjustment involves difficult and tedious manipulation.

Moreover, if it is desired to use a frame whose structure is made of metal wire, e.g. titanium wire, there is not enough material available in which to machine a channel through which the end of the wire can pass. That is why wire frame spectacles are presently fixed by clamping (see Documents U.S. Pat. No. 718,363 and U.S. Pat. No. 2,588,505) or more often by screwing, the lenses then being provided with holes (see Documents U.S. Pat. No. 943,085, U.S. Pat. No. 962,549, U.S. Pat. No. 5,073,020, EP-A-0 554 341).

OBJECTS AND SUMMARY OF THE INVENTION

An object of the invention is to design fixing apparatus having flexible rim elements making it possible to avoid any boring of the frame, while being accurate and simple to implement both for fitting and for removing the lenses.

Another object of the invention is to design fixing apparatus that lends itself particularly well to use in frames of metal wire structure.

The invention solves that problem by means of apparatus for fixing lenses to a spectacles frame, the apparatus comprising, for each lens, a flexible rim element passing along an associated bezel and being secured to the frame on either side of the lens, said apparatus being characterized in that each flexible element is organized to have two end loops which are secured to the frame on either side of the lens in question, merely by engaging over said frame.

It is thus necessary merely to put the flexible element into place by engaging the two end loops over the frame, on either side of the lens, and then to insert the lens by easing the flexible element progressively into the bezel in the lens.

In the particular case of the frame being of metal wire structure, it is advantageous for the frame to comprise, for each lens, a curved portion surrounding a portion of the lens by passing along an associated bezel and being extended on either side of the lens by a bridge hook and by a temple hook to which the two loops of the flexible element are secured. Preferably, for each lens, the two loops of the flexible element engage over the frame at the bends connecting the shaped portion of the frame to the respective hooks.

It is then advantageous for the bezel receiving the shaped portion of the frame to extend the bezel receiving the flexible element so as to form a single bezel running along the entire periphery of the lens.

In a particular embodiment, the flexible element is constituted by a filamentary band which is folded back on itself to form two juxtaposed strands passing along the bezel in the lens in question, the folding of said band directly forming the two end loops of the flexible element. In which case, the two juxtaposed strands are put in place directly, one in front of the frame and one behind said frame, so that the two closed loops engage naturally over the frame. The elements can thus be put into place very quickly.

In another embodiment, the flexible element is constituted by a filamentary segment looped back on itself to form a band whose strands touch each other over a central portion of said flexible element and they are secured to each other along the contacting generator lines, the two portions in which the strands do not touch forming the two end loops. In a variant, the flexible element is constituted by a filamentary segment whose two ends are folded over far enough to form the two end loops which may be held by crimping, for example.

In which case, the two loops must be threaded one after the other onto the frame to put the flexible element in place. The flexible element takes slightly longer to put into place than in the preceding case, but it is easier to manufacture.

The flexible element is constituted by a thread made of a plastics material, in particular nylon or polytetrafluoroethylene, or of a natural material, or, in a variant, of a metal wire, in particular a steel, titanium, or gold wire.

BRIEF DESCRIPTION OF THE DRAWINGS

Other characteristics and advantages of the invention appear more clearly from the following description and the accompanying drawings concerning a particular embodiment, the description being given with reference to the figures, in which:

FIG. 1 is a perspective view of a pair of spectacles whose two lenses are fixed in accordance with the invention;

FIG. 2 is a fragmentary exploded view making it easier to distinguish the flexible element having end loops before it is installed for fixing a lens, the element being shown in the form of a filamentary band that is folded over;

FIG. 3 is a fragmentary front view showing a lens mounted in accordance with the invention by means of the above-mentioned flexible element;

FIG. 4 is view on IV—IV of FIG. 3 on a larger scale, making it easier to see one of the loops of the filamentary band, the loop being secured by engaging over the temple hook of the frame, it being possible to see the curved portion thereof (top half circle);

FIG. 5 is a front view analogous to the FIG. 3 view for a half-moon lens, the flexible element provided with end loops then passing over the top periphery of the lens;

FIG. 6 shows a variant of the above-mentioned flexible element, implemented in the form of a filamentary segment folded back over and having strands that touch and that are secured together over a central portion;

FIG. 7 is a section view analogous to the FIG. 4 section view but showing the flexible element of FIG. 6;

FIG. 8 shows another variant of the above-mentioned flexible element, implemented in the form of a filamentary segment having folded-over ends; and FIG. 9 is a section view analogous to the FIG. 4 section view but showing the flexible element of FIG. 8.

MORE DETAILED DESCRIPTION

FIG. 1 shows a pair of spectacles 1 whose frame 2 is a metal wire structure in this example and is equipped with two lenses V, each of which is fixed in accordance with the invention by means of a flexible element 20. As shown in the figure, the element has two end loops 23, 24 which are secured to the frame on either side of the relevant lens merely by engaging over said frame.

The frame 2 comprises two curved portions 3 (or top half-circles), each of which surrounds a portion of a respective lens V, and a bridge-forming central portion 4. This one-piece filamentary element is connected via two hinges 5 to temples 6.

It can be observed from FIGS. 1 to 3 that each shaped portion 3 is extended at one end by a temple hook 7 and at the other end by a bridge hook 11. The hooks 7 and 11 are formed by folding the frame at respective bends 10 and 13. The temple hook 7 is then folded backwards to form a segment 8 ending in a loop for receiving the pin of the hinge 5, the loop ending in a downwardly extending tip 9 forming a an end-of-opening stop for the associated temple 6. The bridge hook 11 is extended by a loop 12 which serves to receive and hold a nose pad 14, and which is connected to the central portion 4 of the bridge.

With the frame being of metal wire structure, e.g. made of titanium wire, the top of each lens V is provided with a bezel or groove 15 through which the associated curved portion 3 of the frame passes.

Each lens V is fixed to the frame by a flexible rim element passing along an associated bezel and being secured to the frame by means of its two end loops engaging thereover on either side of the lens.

In the embodiment shown in FIGS. 1 to 6, the flexible element is constituted by a filamentary band 20 folded over to form two juxtaposed strands 21 and 22 that pass along a bezel or groove 25 in the lens V in question. Folding said element over directly forms two end loops 23 and 24 which are secured to the frame 2 merely by being engaged thereover.

In this example, the two loops 23 and 24 are engaged respectively over the temple hook 7 and over the bridge hook 11. This engagement preferably takes place at the bends 10 and 13. The loops 23 and 24 are then held properly in place while being very inconspicuous, and in no way spoiling the appearance of the spectacles.

The side view in FIG. 4 shows clearly how the juxtaposed strands 21 and 22 of the closed filamentary loop 20 are disposed by passing along the bezel 25, and how the loop 23 is disposed by passing over the temple hook 7 associated with the curved portion 3 which passes through the bezel 15. The bezel 15 extends the bezel 25 to form a single bezel running around the entire periphery of the lens V, the single bezel not necessarily being of uniform width and depth over both of the two portions that make it up. Depending on the material from which it is made, the filamentary band 20 may have a section of diameter of as little as one tenth of a millimeter, whereas the diameter of the filament making up the curved portions 3 of the frame is about one millimeter.

The exploded view in FIG. 2 shows the filamentary band constituting the flexible element 20 in its annular free state, then as folded over to form the two juxtaposed strands 21 and 22 with the two end loops 23 and 24, in the position which it takes up for fixing the lens. In practice, it is necessary merely to pass the annular flexible element 20 while in the free state over the curved portion 3, and then by coming up against the hooks 7, 11, the two loops 23 and 24 are formed naturally, with the strands 21 and 22 then hanging down freely under the shaped portion, respectively one in front of the frame 2 and the other behind it. The lens V is then put in place by applying the shaped portion 3 against the bezel 15, then by progressively easing the two strands 21 and 22 into the bezel 25 starting with their portions that are adjacent to one of the two loops, if necessary by using a thin tape for assistance, the tape being interposed between the edge of the lens and the two strands of the flexible element. Once the two strands 21 and 22 have been fully inserted into their bezel 25, the lens is held properly in place in the frame.

It is equally simple to remove a lense by progressively easing the two strands 21 and 22 out from their bezel 25.

On fitting the lenses in the frame for the first time, or if slack appears after a period of use, it might be necessary to replace the filamentary band with another band of slightly smaller diameter. In practice, an optician has a set of bands that differ from one another by approximately one or two millimeters.

FIG. 5 shows a half-moon lens fixed in the same way (the same references are used). In this case, the shaped portion 3 extends around the bottom periphery of the lens, and the flexible element 20 in the form of a filamentary band passes over the top portion of the lens. The technique used is thus the same, which shows that the invention is not limited to fixing lenses from below.

The filamentary band 20 may be smooth over its entire length (by its end loops being welded in place, or by it being molded), or it may be constituted by a segment of filament whose ends are formed into loops by being knotted or crimped. In which case, the knot or crimping must be as inconspicuous as possible, e.g. by providing a small side notch in one side of each lens for receiving the knot or the crimping, and to prevent it from slipping out of place.

The variant shown in FIGS. 6 and 7 uses the same concept of a flexible element having two end loops for securing by engaging over the frame. However, the flexible element 20 shown in FIGS. 6 and 7 is constituted by a filamentary segment that is closed to form a band whose strands touch each other over a central portion of said element and are bonded together along the contacting generator lines. It is thus possible to see the strand 21 and strand 22 which is interrupted and therefore comprises two portions, referenced 22.1 and 22.2, and disposed end-to-end at 26 in this example. In a variant, it is possible to leave a gap between the ends. The strands may be bonded together by any means, such as welding or gluing. The two portions in which the strands do not touch then form the end loops 23 and 24. In which case, the flexible element 20 must be threaded onto the frame via its loops 23, 24 by gradually sliding it along the frame to its final position, after which the associated lens V is fitted by easing the double strand into the bezel 25 in said lens.

In the variant shown in FIGS. 8 and 9, the flexible element 20 is constituted by a filamentary segment whose ends are folded over far enough to form the two end loops. It then has one long strand 21 that passes along the bezel 25 in the associated lens V, and two short strand portions 22.1 and 22.2 serving to form the two securing loops 23, 24 which are closed by knotting, braiding, welding, or, as shown, crimping referenced 27, each loop being threaded onto the frame on either side of the shaped portion prior to the lens being put in place, by easing the long strand 21 into the bezel 25 in the lens.

In all cases, the flexible element 20 can be constituted by a thread made of a plastics material, e.g. a nylon or a polytetrafluoroethylene thread. With this type of material, it is possible to use very fine threads of diameter that can be as little as one tenth of one millimeter. It is also possible to use a thread made of a natural material, e.g. hair, or a metal wire, e.g. made of steel, titanium, or gold, or else a textile thread or a rubber thread.

Naturally, the fixing apparatus of the invention is not limited to a particular type of frame. Most frames made of metal, plastics, or natural materials, carbon fiber or glass fiber can be used, provided there is an abutment portion on either side of the lens for hooking the end loops of the flexible element. In which case, the tops of the lenses are generally bevelled, i.e. without bezels, so that the lens can be put in place against the rigid frame, the only bezel then being the bezel serving to receive the central portion of the flexible element. No boring of the frame is therefore required, unlike prior techniques.

It is also possible to use lens margin elements surrounding the lenses entirely or in part, as is well known in the field of spectacles frames: in which case, instead of being machined in the lens, the bezel serving to receive the central portion of the flexible element is machined in the associated lens margin element (variant not shown).

In all cases, a mode of fixing is obtained that is both simple and reliable while being cheap. Fitting and removing lenses is easy and quick, and the precision obtained is quite satisfactory. The appearance is also excellent because the flexible element is almost invisible.

The invention is not limited to the above-described embodiments, but rather it covers any variant reproducing the above-mentioned characteristics by using equivalent means.

I claim:

1. Apparatus for fixing lenses to a spectacles frame, the apparatus comprising, for each lens (V), a flexible rim element (20) passing along an associated bezel (25) and being secured to the frame (2) on either side of the lens (V), wherein each flexible element (20) is organized to have two end loops (23, 24) which are secured to the frame (2) on either side of the lens (V) in question, merely by engaging over said frame.

2. Apparatus according to claim 1, in which the frame is of metal wire structure, wherein, for each lens (V), the frame (2) comprises a curved portion (3) surrounding a portion of the lens by passing along an associated bezel (15) and being extended on either side of the lens by a bridge hook (11) and by a temple hook (7) to which the two loops (24, 23) of the flexible element (20) are secured.

3. Apparatus according to claim 2, wherein for each lens (V), the two loops (23, 24) of the flexible element (20) engage over the frame at the bends (10, 13) connecting the shaped portion (3) of the frame (2) to the respective hooks (7, 11).

4. Apparatus according to claim 2 wherein for each lens (V), the bezel (15) receiving the shaped portion (3) of the frame (2) extends the bezel (25) receiving the flexible element (20) so as to form a single bezel running along the entire periphery of the lens.

5. Apparatus according to claim 1, wherein the flexible element (20) is constituted by a filamentary band which is folded over to form two juxtaposed strands (21, 22) passing along the bezel (25) in the lens in question (V), the folding of said band directly forming the two end loops (23, 24) of the flexible element (20).

6. Apparatus according to claim 1, wherein the flexible element (20) is constituted by a filamentary segment which is looped back on itself to form a band whose strands (21; 22.1, 22.2) touch each other over a central portion of said flexible element and they are secured to each other along the contacting generator lines, the two portions in which the strands do not touch forming the two end loops (23, 24).

7. Apparatus according to claim 1, wherein the flexible element (20) is constituted by a filamentary segment whose two ends are folded over far enough to form the two end loops (23, 24).

8. Apparatus according to claim 7, wherein the two end loops (23, 24) are held by crimping (27).

9. Apparatus according to claim 1, wherein the flexible element (20) is constituted by a thread made of a plastics material, in particular nylon or polytetrafluoroethylene, or of a natural material.

10. Apparatus according to claim 1, wherein the flexible element (20) is constituted by a metal wire, in particular a steel, titanium, or gold wire.

* * * * *